US010578709B1

(12) United States Patent
Hodges et al.

(10) Patent No.: US 10,578,709 B1
(45) Date of Patent: Mar. 3, 2020

(54) TRANSPOSITIONAL MODULATION FOR DEFENSIVE MEASURES (71) Applicant: TM IP Holdings, LLC, Tucson, AZ (US)

(72) Inventors: Daniel L. Hodges, Tucson, AZ (US); Richard C. Gerdes, Tucson, AZ (US)

(73) Assignee: TM IP Holdings, LLC, Tucson, AZ (US)

( * ) Notice: Subject to any disclaimer, the term of this patent is extended or adjusted under 35 U.S.C. 154(b) by 203 days.

(21) Appl. No.: 15/492,700

(22) Filed: Apr. 20, 2017

(51) Int. Cl.
*G01S 7/36* (2006.01)
*G01S 13/66* (2006.01)
*G01S 15/66* (2006.01)
*G01S 7/537* (2006.01)

(52) U.S. Cl.
CPC ............... *G01S 7/36* (2013.01); *G01S 7/537* (2013.01); *G01S 13/66* (2013.01); *G01S 15/66* (2013.01)

(58) Field of Classification Search
CPC . G01S 7/36; G01S 7/537; G01S 13/66; G01S 15/66
USPC .......................................................... 342/17
See application file for complete search history.

(56) References Cited

U.S. PATENT DOCUMENTS

| 3,706,945 | A | | 12/1972 | Yanagidaira |
| 3,968,486 | A | | 7/1976 | Gerdes |
| 4,017,855 | A | * | 4/1977 | Buck ........................ G01S 7/292 324/300 |
| 4,259,888 | A | | 4/1981 | Gross |
| 4,301,415 | A | | 11/1981 | McFayden |
| 4,613,974 | A | | 9/1986 | Vokac et al. |
| 4,680,633 | A | | 7/1987 | Gerdes et al. |
| 4,989,219 | A | | 1/1991 | Gerdes et al. |
| 5,021,786 | A | | 6/1991 | Gerdes |
| 5,119,391 | A | | 6/1992 | Maeda |
| 5,124,706 | A | | 6/1992 | Gerdes |
| 5,184,218 | A | | 2/1993 | Gerdes |
| 5,200,715 | A | | 4/1993 | Gerdes et al. |
| 5,327,237 | A | | 7/1994 | Gerdes et al. |

(Continued)

FOREIGN PATENT DOCUMENTS

| WO | WO2004040403 | 5/2004 |
| WO | WO2012082781 | 6/2012 |

(Continued)

OTHER PUBLICATIONS

M. Leclerc et al: "Performance analysis of an in-band COFDM / FM digital audio broadcasting system", Electrical and Computer Engineering, Sep. 14-17, 1993, pp. 652-655.

(Continued)

*Primary Examiner* — Frank J McGue
(74) *Attorney, Agent, or Firm* — Fish & Richardson P.C.

(57) ABSTRACT

Methods, systems, and apparatus, including computer programs encoded on a computer storage medium, for detecting electronic counter measure (ECM) signals and embedding covert messages in radar or sonar signals. In one aspect, a method for detecting ECM signals includes receiving a radar return signal from an object. The method includes determining whether radar return signal includes a TM signal, and identifying the radar return signal as a skin return signal or an electronic counter measure signal based on whether the radar return signal includes the TM signal.

21 Claims, 5 Drawing Sheets

(56) References Cited

U.S. PATENT DOCUMENTS

| | | | |
|---|---|---|---|
| 5,483,240 A * | 1/1996 | Hsu | F41G 7/224 |
| | | | 342/13 |
| 5,511,100 A | 4/1996 | Lundberg et al. | |
| 5,557,333 A | 9/1996 | Jungo et al. | |
| 6,052,410 A | 4/2000 | Okita | |
| 6,173,062 B1 | 1/2001 | Dibachi et al. | |
| 6,522,697 B1 | 2/2003 | Spickermann | |
| 6,559,757 B1 | 5/2003 | Deller et al. | |
| 6,788,154 B2 | 9/2004 | Maneatis | |
| 7,856,050 B1 | 12/2010 | Wiss et al. | |
| 8,472,514 B2 | 6/2013 | Dabiri | |
| 8,537,952 B1 | 9/2013 | Arora | |
| 9,014,293 B2 | 4/2015 | Gerdes | |
| 9,338,041 B1 | 5/2016 | Gerdes | |
| 9,338,042 B1 | 5/2016 | Gerdes | |
| 9,379,925 B2 | 6/2016 | Gerdes | |
| 9,426,014 B1 | 8/2016 | Gerdes | |
| 9,455,852 B1 | 9/2016 | Gerdes | |
| 9,455,863 B1 | 9/2016 | Gerdes | |
| 9,461,854 B1 | 10/2016 | Gerdes | |
| 9,473,983 B1 | 10/2016 | Gerdes et al. | |
| 9,515,815 B2 | 12/2016 | Gerdes | |
| 9,516,490 B1 * | 12/2016 | Gerdes | H04W 8/005 |
| 9,621,386 B2 | 4/2017 | Gerdes | |
| 9,621,398 B2 | 4/2017 | Gerdes | |
| 9,628,318 B1 | 4/2017 | Gerdes et al. | |
| 2001/0038309 A1 | 11/2001 | Hagemeyer | |
| 2003/0071684 A1 | 4/2003 | Noori | |
| 2003/0142741 A1 | 7/2003 | Hartmann | |
| 2004/0247041 A1 | 12/2004 | Biedka et al. | |
| 2004/0252531 A1 | 12/2004 | Cheng et al. | |
| 2005/0200391 A1 | 9/2005 | Steinbach et al. | |
| 2006/0006914 A1 | 1/2006 | Fan-Jiang | |
| 2006/0197564 A1 | 9/2006 | Yen | |
| 2007/0041485 A1 | 2/2007 | Chang | |
| 2008/0253479 A1 | 10/2008 | Davidow | |
| 2009/0154589 A1 | 6/2009 | Monnerie | |
| 2010/0128713 A1 | 5/2010 | LeBars | |
| 2011/0043039 A1 | 2/2011 | Mancebo | |
| 2011/0051780 A1 | 3/2011 | Kawasaki | |
| 2011/0151821 A1 | 6/2011 | Sorrells | |
| 2011/0222621 A1 | 9/2011 | Christensen et al. | |
| 2012/0171963 A1 | 7/2012 | Tsfaty | |
| 2014/0269969 A1 | 9/2014 | Gerdes | |
| 2015/0023456 A1 | 1/2015 | Vann et al. | |
| 2015/0200796 A1 | 7/2015 | Gerdes | |
| 2016/0173302 A1 | 6/2016 | Gerdes | |
| 2016/0197751 A1 | 7/2016 | Gerdes | |
| 2017/0026211 A1 | 1/2017 | Gerdes | |
| 2017/0033968 A1 | 2/2017 | Gerdes | |
| 2017/0085404 A1 | 3/2017 | Gerdes | |

FOREIGN PATENT DOCUMENTS

| | | |
|---|---|---|
| WO | WO2014143046 | 9/2014 |
| WO | WO2014145868 | 9/2014 |
| WO | WO2017019130 | 2/2017 |
| WO | WO2017019131 | 2/2017 |

OTHER PUBLICATIONS

Yang Liu et al: "High Order QAM Signals Recognition Based on Layered Modulation", ICCCAS 2009. International Conference on Communications, Circuits and Systems, IEEE, Jul. 23, 2009, pp. 73-76.

J. B. Evans et al: "The Rapidly Deployable Radio Network", IEEE Journal on Selected Areas in Communications, IEEE Service Cenier, vol. 17, No. 4, Apr. 1, 1999, pp. 689-703.

Scott Chiu et al: "A 900 MHz UHF RFID Reader Transceiver IC", IEEE Journal of Solid-State Circuits, IEEE Service Center, Piscataway, NJ, USA vol. 42, No. 12, Dec. 1, 2007, pp. 2822-2833.

Pascal Scarlart et al.: "Performance Analysis of a COFDM/FM In-band Digital Audio Broadcasting System", IEEE Transactions on Broadcasting, IEEE Service Center, Piscataway, NJ, US; vol. 43, No. 2, dated Jun. 1, 1997, XP01100607; pp. 191-198.

* cited by examiner

TRANSPOSITIONAL MODULATION FOR DEFENSIVE MEASURES

BACKGROUND

Electronic counter measures (ECM) are used to deceive electronic detection and tracking systems. Some ECMs act as a decoy by manipulating radar signals to confuse electronic detection or tracking systems. In some cases, electronic counter-countermeasures (ECCM) can be used to reduce or eliminate the effects of ECMs on electronic detection and tracking systems.

SUMMARY

This specification relates to methods and systems for implementing transpositional modulation (TM) capable devices in contexts related to defense. More specifically, some aspects of the specification relate to methods and systems that use TM modulated signals to improve the resiliency of target tracking systems to the effects of ECMs. Some aspects of the specification relate to methods and systems that use TM signals to embed a covert communications channel in radar or sonar signals.

In general, innovative aspects of the subject matter described in this specification can be embodied in methods that include the actions of receiving a radar return signal from an object, determining whether radar return signal includes a TM signal, and identifying the radar return signal as a skin return signal or an electronic counter measure signal based on whether the radar return signal includes the TM signal. Other implementations of this aspect include corresponding systems, apparatus, and computer programs, configured to perform the actions of the methods, encoded on computer storage devices.

These and other implementations can each optionally include one or more of the following features.

In some implementations, identifying the radar return signal as the skin return signal or the electronic counter measure signal includes, in response to determining that the radar return signal includes the TM signal, identifying the radar return signal as the skin return signal. In some implementations, the method includes in response to identifying the radar return signal as the skin return signal, sending data to a missile guidance system to guide a missile towards the object. In some implementations, the method includes in response to identifying the radar return signal as the skin return signal, sending data to a friendly unit to allow the friendly unit to track the object.

In some implementations, identifying the radar return signal as the skin return signal or the electronic counter measure signal includes, in response to determining that the radar return signal does not include the TM signal, identifying the radar return signal as the electronic counter measure signal. In some implementations, the method includes in response to identifying the radar return signal as the electronic counter measure signal, shifting a target tracking system to a different operational mode. In some implementations, the method includes in response to identifying the radar return signal as the electronic counter measure signal, sending data to a friendly unit informing the friendly unit of the electronic counter measure signal.

In some implementations, determining whether the radar return signal includes the TM signal includes detecting any time shifts in a harmonic of the radar return signal.

In some implementations, the method includes causing a transmitter to transmit a radar signal that includes the TM signal.

In some implementations, the radar signal is a continuous wave signal modulated with the TM signal.

In another general aspect, the subject matter described in this specification can be embodied in methods that include actions of receiving a portion of a covert message for transmission to a friendly unit, generating a transpositional modulation (TM) signal to encode the portion of the covert message, adding the TM signal to a radar signal or a sonar signal, and transmitting the radar or sonar signal including the TM signal. Other implementations of this aspect include corresponding systems, apparatus, and computer programs, configured to perform the actions of the methods, encoded on computer storage devices.

These and other implementations can each optionally include one or more of the following features.

In some implementations, the covert message includes target tracking information. In some implementations, the covert message includes target identification information. In some implementations, the covert message includes identifying information of a unit associated with the system. In some implementations, the covert message includes an emergency message.

In some implementations, the method includes receiving a radar return signal from an object, and identifying the radar return signal as an electronic counter measure signal based determining that the radar return signal does not include the TM signal, where the covert message includes information about the electronic counter measure signal.

In some implementations, the method includes receiving a radar return signal from an object, and identifying the radar return signal as skin return signal based determining that the radar return signal does include the TM signal, where the covert message includes information the object.

In some implementations, the radar or sonar signal is a continuous wave signal modulated with the TM signal. In some implementations, the radar or sonar signal is modulated with a non-TM signal. In some implementations, the radar or sonar signal is a chirp signal Particular implementations of the subject matter described in this specification can be implemented so as to realize one or more of the following advantages. Implementations may improve the resiliency of target tracking systems to the effects of ECMs. Implementations may improve the ability of target tracking systems to identify target decoys or false return signals. Implementations may provide a covert communication channel within radar and/or sonar signals.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure generally relate to methods and systems for implementing transpositional modulation (TM) capable devices in contexts related to defense. More specifically, some aspects of the specification relate to methods and systems that use TM modulated signals to improve the resiliency of target tracking systems to the effects of ECMs. Some aspects of the specification relate to methods and systems that use TM signals to embed a covert communications channel in radar or sonar signals.

As used herein the terms "Transpositional Modulation," "TM modulation," "TM," and "TM signal" refer to techniques of adding information to a carrier signal without affecting the amplitude, frequency or phase of the carrier signal (or a signal that is modulated according to such a technique) as observed by a traditional receiver or demodulator (e.g., a non-TM capable receiver/demodulator). Transpositional modulation can be generated by several techniques. For example, in a "wide-band TM modulation" technique information is conveyed by modulating the inflection points of a carrier wave to represent data. For example, in a "harmonic TM modulation" technique information is conveyed by altering (e.g., transposing, time shifting) a harmonic of a carrier signal. For example, Transpositional Modulation can be produced by altering a third harmonic or other harmonics of a carrier signal (e.g., a fourth harmonic, fifth harmonic, sixth harmonic, etc.). For example, in an "internal TM modulation" technique information is conveyed by altering a periodic signal (an "internal TM modulation signal") which is applied to the carrier signal. Any effects of the TM internal modulation signal on either the carrier wave itself or another traditional modulation signal (e.g., non-TM signal) carried by the carrier wave cancel over the symbol frame of a non-TM modulation signal, and consequently, are not detectable by a traditional signal demodulator. Examples of documents that describe techniques for performing TM modulation and demodulation and/or uses of transpositional modulation include, but are not limited to, U.S. Pat. No. 9,014,293 entitled "TRANSPOSITIONAL MODULATION SYSTEMS AND METHODS;" U.S. Pat. No. 9,338,041 entitled "EXTRACTING CARRIER SIGNALS FROM MODULATED SIGNALS;" U.S. Pat. No. 9,338,042 entitled "SEPARATING AND EXTRACTING MODULATED SIGNALS;" U.S. Pat. No. 9,473,983 entitled "TRANSPOSITIONAL MODULATION COMMUNICATIONS BETWEEN DEVICES;" U.S. Pat. No. 9,515,815 entitled "TRANSPOSITIONAL MODULATION SYSTEMS, METHODS AND DEVICES;" U.S. Pat. No. 9,516,490 entitled "IDENTIFYING DEVICES WITH TRANSPOSITIONAL MODULATION;" and U.S. Pat. No. 9,628,318 entitled "TRANSPOSITIONAL MODULATION COMMUNICATIONS." TM signals generated by each of the above techniques share the same characteristics in that the TM signals add information to a carrier signal without affecting the amplitude, frequency or phase of the carrier signal as observed by a traditional demodulator (e.g., non-TM demodulator) and the TM signals are not detectable by traditional demodulators, for example, those used for amplitude, frequency, or phase modulated signals.

Figure 1:
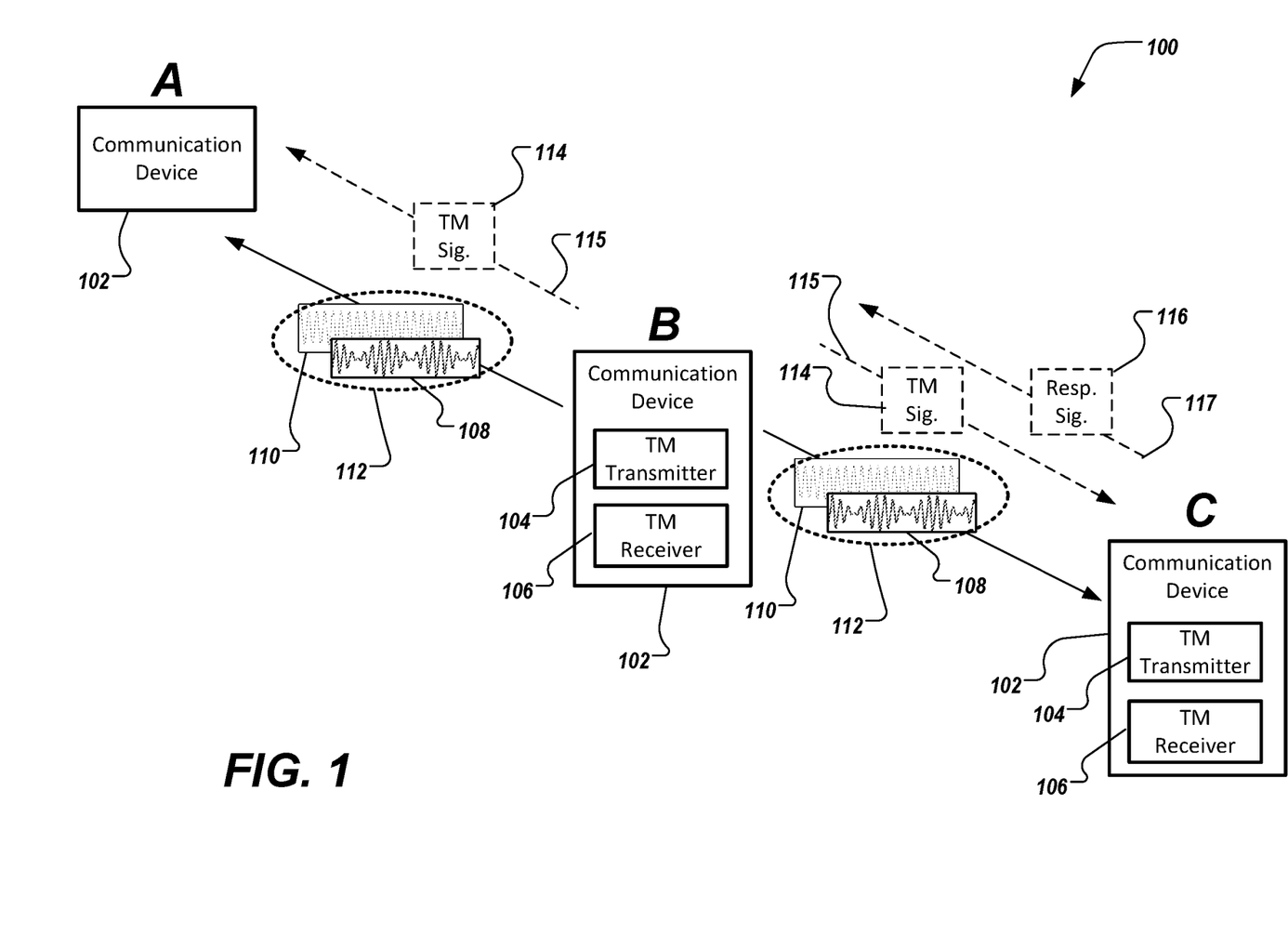
FIG. 1 depicts an example system in accordance with implementations of the present disclosure.

FIG. 1 depicts an example system 100 in accordance with implementations of the present disclosure. As an introduction to transpositional modulation (TM) and its advantages, system 100 is described in the context of a system of communication devices 102. However, in some implementations, as described in more detail below, similar techniques can be implemented in systems that have applications to defensive measures, for example, radar and sonar tracking systems.

The system 100 may be a radio frequency (RF) communication system, a satellite communication system, a landline communication system (e.g., a telephony or cable network), an optical communication system, or any other system of communication devices 102. The communication devices 102 include systems for modulating a carrier signal with an information signal using traditional modulation techniques and transmitting and receiving the modulated signal from one communication device 102 to/from another. Traditional modulation techniques include, for example, amplitude modulation (AM), frequency modulation (FM), and phase modulation (PM) in addition to complex modulation techniques that incorporate aspects of AM, FM, and PM such as quadrature phase shift keying (QPSK), amplitude phase shift keying (APSK) and including quadrature amplitude modulation (QAM). In addition, communication devices B and C include a TM transmitter 104 and a TM receiver 106. In some examples, a TM transmitter 104 and/or a TM receiver 106 can be integrated with traditional transmitters and receivers. The TM transmitter 104 and/or TM receiver 106 can be implemented as hardware devices (e.g., integrated circuits, chip-sets, application specific integrated circuits (ASIC), or field programmable logic arrays (FPGA)) or they can be implemented in software (e.g., as a software defined radio (SDR)).

The system 100 can combine a traditionally modulated signal 108 with a TM modulated signal 110 on the same carrier using a TM transmitter 104, thereby increasing the overall data rate of the combined signal 112. The TM modulated signal 110 can be separated from the combined signal 112 and demodulated by a TM receiver 106. Likewise, the traditionally modulated signal 108 can be separately demodulated with no interference caused by the TM modulated signal 110. This is possible because TM modulated signals are undecipherable by non-TM receivers, instead appearing as a slight increase of noise in traditionally modulated signal or the carrier.

For example, communication device B may transmit a combined signal 112, which includes both a traditionally modulated signal 108 and a TM signal 110, to both communication device A and communication device B. Communication device A, which does not include a TM capable receiver will be able to detect and demodulate the traditionally modulated signal, but will be unable to detect the TM signal. The TM signal will, instead appear as noise to communication device A. However, communication device C, which does include a TM receiver 106, will detect and demodulate both the traditionally modulated signal 108 and the TM signal 110 in the combined signal 112. The TM receiver 106 of communication device C separates and extracts the TM modulated signal 110 from the combined signal 112, and then demodulates the TM modulated signal 110 to obtain the TM modulated data signal. Communication device C employs a traditional signal receiver to demodulate the traditionally modulated signal 108.

Systems and techniques for modulating and demodulating TM signals are described in the U.S. Patents listed above. More specifically, U.S. Pat. Nos. 9,014,293 and 9,515,815 describe several systems and methods for producing and demodulating TM signals including the above noted "wideband" and "harmonic" modulation techniques, among others. U.S. Pat. Nos. 9,014,293 and 9,515,815 are each incorporated herein by reference in their entirety. U.S. Pat. No. 9,338,042 describes systems and methods for separating TM signals from combined signals as well as TM modulation and demodulation using "harmonic" modulation techniques. U.S. Pat. No. 9,338,042 is incorporated herein by reference in its entirety.

In some implementations, the carrier signal can be an intermediate frequency (IF) carrier signal. That is, the carrier signal is not necessarily at the same frequency of the carrier upon which the signal is ultimately be transmitted, but may be at an IF used internally within a system (e.g., a satellite communication system) as an intermediate step in either signal transmission or reception. That is, in the case of signal transmission, a system may up-convert a combined signal 112 from the IF signal to a transmission carrier frequency prior to transmitting the combined signal 112. Conversely, in the case of signal reception, a system may down-convert a modulated signal from the transmission carrier frequency to an IF frequency before separating the TM modulated signal 110 from the combined signal 112. In other implementations, an IF carrier signal may not be used, and the transmission carrier signal can be modulated with both a traditionally modulated signal and a TM modulated signal.

In some implementations, because TM signals are not detectable by traditional receivers, a TM capable device can identify whether other devices have TM reception and transmission capabilities by transmitting a carrier signal modulated with a TM signal to the other devices. For example, communication device B can send a query signal 114 that includes a carrier signal modulated with a TM signal to one or more other devices (as indicated by dashed line 115) such as communication device A and communication device C. Communication device C, which includes a TM transmitter 104 and a TM receiver 106, will be able to detect the TM modulation within the query signal 114. However, communication device A, which does not include a TM transmitter 104 or a TM receiver 106, will detect only the carrier wave of the query signal. Thus, communication device C will be able to respond to the query signal 114, but communication device A will not. Communication device C can send a response signal 116 (as indicated by dashed line 117) that includes a carrier signal modulated with a TM signal to communication device B. Communication device B will detect the TM signal included in the response signal 116 and, thereby, determine that communication device C is capable of TM communications.

The query signal 114 can include, for example, only a carrier signal with TM modulation (e.g., signal 110) or a combined signal 112 including a carrier modulated with both a traditionally modulated signal 108 and a TM modulated signal 110. In some examples, the query signal 114 can include instructions requesting information about the other device encoded in either a TM modulated signal 110, a traditionally modulated signal 108, or both. However, in some examples, the TM modulated signal 110 need not include any specific information or instructions because if another device is not capable of receiving TM signals the other device would not even detect the TM modulated signal 110 or the encoded information. Thus, a TM capable device need only send a response signal 116 that includes TM modulation to indicate that the device is capable of receiving TM signals.

In implementations, in which the query signal 114 includes both a traditionally modulated signal 108 and a TM modulated signal 110, devices that are not capable of TM communications (e.g., communication device A) may send a response to the non-TM portion of the query signal 114. However, a response from a non-TM capable device would only include a traditionally modulated signal and not a TM modulated signal. Therefore, to determine whether a responding device was TM capable, the querying device (e.g., communication device B) would only need to determine whether the response included a TM modulated signal 110. If not, the response can be ignored.

In a defense context, the TM query signal 114 can be applied to a radar or sonar signal. In such implementations, the TM signal can be used to identify friends and foes. For example, only friendly forces may be equipped with TM capable systems. Thus, only friendly forces will be able to detect TM signals embedded within a radar/sonar signal. Consequently, upon detecting a TM single in a received radar/sonar signal, the receiving unit can readily identify the sonar/radar as originating from another friendly unit. Furthermore, the TM signals embedded in radar/sonar signals can be used to carry covert messages for other friendly units within range of the radar/sonar signals. In other words, by adding TM to a radar/sonar signals such signals may be used not only for target searching and tracking, but also to transmit covert messages to nearby friendly units.

In some implementations, a TM signal may also provide a means for identifying false radar returns generated by enemy ECMs. For example, an enemy decoy that generates a spoofing signal may receive a radar signal with the embedded TM signal, but, if the decoy does not have a TM capable receiver and/or transmitter, the decoy would not detect or transmit the TM signal. Consequently, the decoy may generate a spoofing signal that includes many or all of the attributes of the original radar signal, but would not include the TM signal. Friendly units that are TM capable and receive the spoofing signal can readily recognize that the signal is a false return because it lacks the TM signal, whereas legitimate radar return, being a reflection of the original radar signal, would include the TM signal.

Figure 2A:
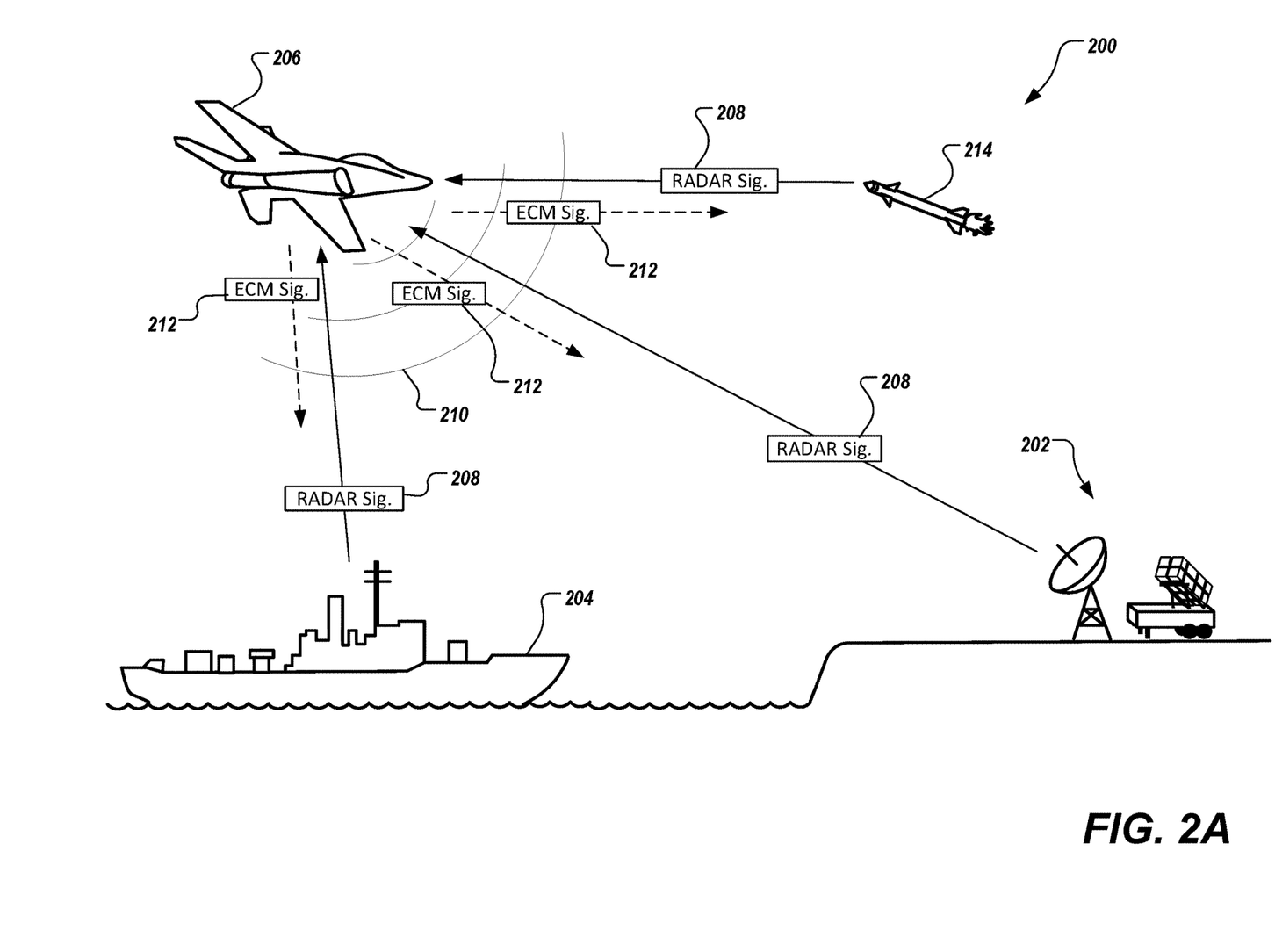
FIGS. 2A and 2B depict example systems that implements aspects of the present disclosure in contexts related to defense.

FIG. 2A depicts an example defense environment 200 for employing the techniques discussed above. The example environment is described in the context of defeating electronic counter measures in an anti-aircraft warfare. The environment 200 includes a friendly ground-based air defense system 202, a friendly naval vessel 204, and an enemy aircraft 206. Both the air defense system 202 and the vessel 204 have TM capable radar systems. That is, both the air defense system 202 and the vessel 204 have radar systems that include TM transmitters and TM receivers. Enemy aircraft 206 has an ECM spoofing system that is not TM capable.

Either one or both of the air defense system 202 and vessel 204 transmits a radar signal 208 with an embedded TM signal. When the radar signal 208 produces a skin return 210 when it reflects off of enemy aircraft 206. The skin return 210 is a legitimate return signal and, being a reflection of the radar signal 208, will include the TM signal. In addition, a spoofing device on or associated with (e.g., in the case of a towed decoy or a remote piloted decoy (drone)) enemy aircraft 206 may receive the radar signal 208. The spoofing device will, however, be unable to detect the TM signal embedded in the radar signal 208. Consequently, when the spoofing device transmits a deceptive ECM signal 212, the ECM return signal 212 will not include the TM signal. One or both of the air defense system 202 and vessel 204 may receive the skin return 210 and the deceptive ECM signal 212. However, TM capable receivers on either platform can readily distinguish between the legitimate skin return 210 and the deceptive ECM signal 212 based on which return signal includes the TM signal.

For example, a TM capable radar receiver can receive radar return signals and determine whether the return signal includes a TM signal. If the return signal includes a TM signal, it is likely a legitimate skin return 210 from a target object. Upon detecting the TM signal, the radar receiver may pass the return to a target tracking system for additional processing. If the return signal does not include a TM signal, it is not a legitimate skin return 210. A return signal that does not include a TM signal is likely a deceptive ECM signal 212. Upon determining that that the return signal does not include a TM signal, the radar receiver can simply ignore the return, or the radar receiver may pass the return signal to a target tracking system along with an indication that the return is an ECM signal 212.

In some implementations, having identified the return signal as an ECM signal 212, the target tracking system may use the ECM signal to track the ECM signals source (e.g., decoy) separately from the target (e.g., enemy aircraft 206). For example, the target tracking system may be a guidance system of a missile 214 fired at enemy aircraft 206. The missile guidance system may use the ECM signal to home in on the ECM source or to aid in distinguishing the skin returns 210 of the target from the ECM signals 212. For example, if a return is identified as an ECM signal 212, the missile guidance system may shift from an active radar homing mode to a different homing mode, for example, a home-on-jam mode.

In some implementations, TM capable radar systems that embed a TM signal in a radar signal 208 may be more effective against some types of spoofing devices. For example, spoofing devices can be generally categorized as range spoofing devices and velocity spoofing devices. Range spoofing devices generally store a copy of a radar signal and retransmit the copy of the signal, with no alteration or only amplification, after a delay period. The delayed return is intended to confuse the ranging capabilities of the radar receiver by making a target's range appear greater than it is. This technique may be referred to as "range gate pull off." An analogous technique, "range gate pull in," transmits the copied radar signal preemptively, before a subsequent pulse is received in an attempt to confuse a radar receiver by making a target's range appear closer than it is. Velocity spoofing devices generally alter a copy of the radar signal before retransmitting the copy. For example, a velocity spoofing device may create a false Doppler shift in in the copied radar signal in an attempt to confuse velocity detection capabilities of a radar receiver. A velocity spoofing devices attempts to deceive the radar receiver by making a target's velocity appear greater or less than the target's true velocity. This technique may be referred to as "velocity gate pull off."

In some implementations, TM capable radar systems may be more effective against ECM devices that alter a copy of the radar signal 208 such as devices that employ velocity gate pull off techniques. For example, because such ECM devices must alter the radar signal 208, they will more likely remove or alter the TM signal by altering the radar signal 208. Moreover, if the ECM device is not TM capable, it will not be able to detect the TM signal, reproduce the TM signal, or both. Moreover, any signal processing performed on the radar signal to alter it will remove or alter the original TM signal. Therefore, the ECM signal transmitted by the ECM device will be distinguishable from the reflected skin return 210 of the target.

In some implementations, ECM devices which do not alter the received signal, but retransmit a copy of the received radar signal 208 may, unintentionally, reproduce the TM signal depending on how the ECM digitizes and stores the received radar signal 208. That is, such ECM devices, while being incapable of actually detecting the TM signal, may, nonetheless, reproduce the TM signal by virtue of having stored and re-transmitted an exact copy of the received radar signal 208. However, even range spoofing ECM devices may not reproduce the TM signal or may not accurately reproduce the TM signal. For example, range spoofing ECM devices may include noise filters that inadvertently remove the TM signal as noise. As another example, when sampling and/or storing a radar signal 208, range spoofing ECM devices may insufficiently sample the radar signal 208 such that the TM signal is not adequately reproduced in the copy of the radar signal that is transmitted as the ECM signal 212. For example, analog to digital conversion process of the ECM device may not quantize the sample of the radar signal at a sufficient resolution to capture the TM signal that appears as noise, or may not use a sufficiently high sampling frequency to accurately capture the TM signal.

In some implementations, a TM capable radar systems can configure attributes of a TM signal to generate TM signals that lie outside of the processing capabilities of enemy ECM devices to reduce the chances of an enemy ECM device inadvertently copying the TM signal. For example, TM capable radar systems can employ the "wide band" TM modulation technique to generate TM signals that lie outside the processing capabilities of enemy ECM devices. TM capable radar systems can configure symbol frequencies and amplitudes of TM signals to reside outside the processing capabilities of enemy ECM devices. For example, such configurations to TM signals can be used to ensure that at least some of the frequency spectra of the TM signal lies outside of a pass-band of filters used by enemy ECM devices, above a nyquist sampling rate of enemy ECM devices, or both. In some implementations, the TM capable radar system can modify characteristics of the non-TM radars signal to expand its bandwidth. For example, the TM capable radar system can modulate the radar signal with a non-TM modulation signal so as to expand the bandwidth of the non-TM radar signal to encompasses the full-bandwidth of the TM signal. Accordingly, the non-TM radar signal can be used to mask the expanded bandwidth of the TM signal.

A radar signal 208 in which a TM signal is embedded can include, but is not limited to, a continuous wave (CW) radar signal (e.g., the CW signal may serve as the carrier for the TM signal), a pulsed radar signal, or a modulated radar signal (e.g., a pulse compression signal such as a chirp signal).

The TM signal that is added to a radar signal 208 can be a TM signal that does not convey any usable information. For example, the TM signal can be a pulse signal or a chip that is modulated using transpositional modulation and added the radar signal 208. The TM signal can be a random signal that is modulated using transpositional modulation. In such examples, the TM signal may simply be used as a binary check for processing radar return signals to determine whether or not a return includes or does not include TM.

Accordingly, in such examples, any actual information contained in a TM signal may be irrelevant to the radar receiver.

In some implementations, TM signals can be used to convert traditional radar signals to covert communication channels. A TM signal that is added to a radar signal 208 can be used to covertly carry information for use by other friendly units. For example, an information signal, or portion thereof depending on a radar pulse length and the size of the information signal, can be used to generate the TM signal that is added to a radar signal 208. Information carried by a TM signal can include, but is not limited to, identification information associated with the unit transmitting the radar signal, target identification or target tracking data, an emergency message, an operational message (e.g., orders to nearby friendly units), or other covert data.

Figure 2B:
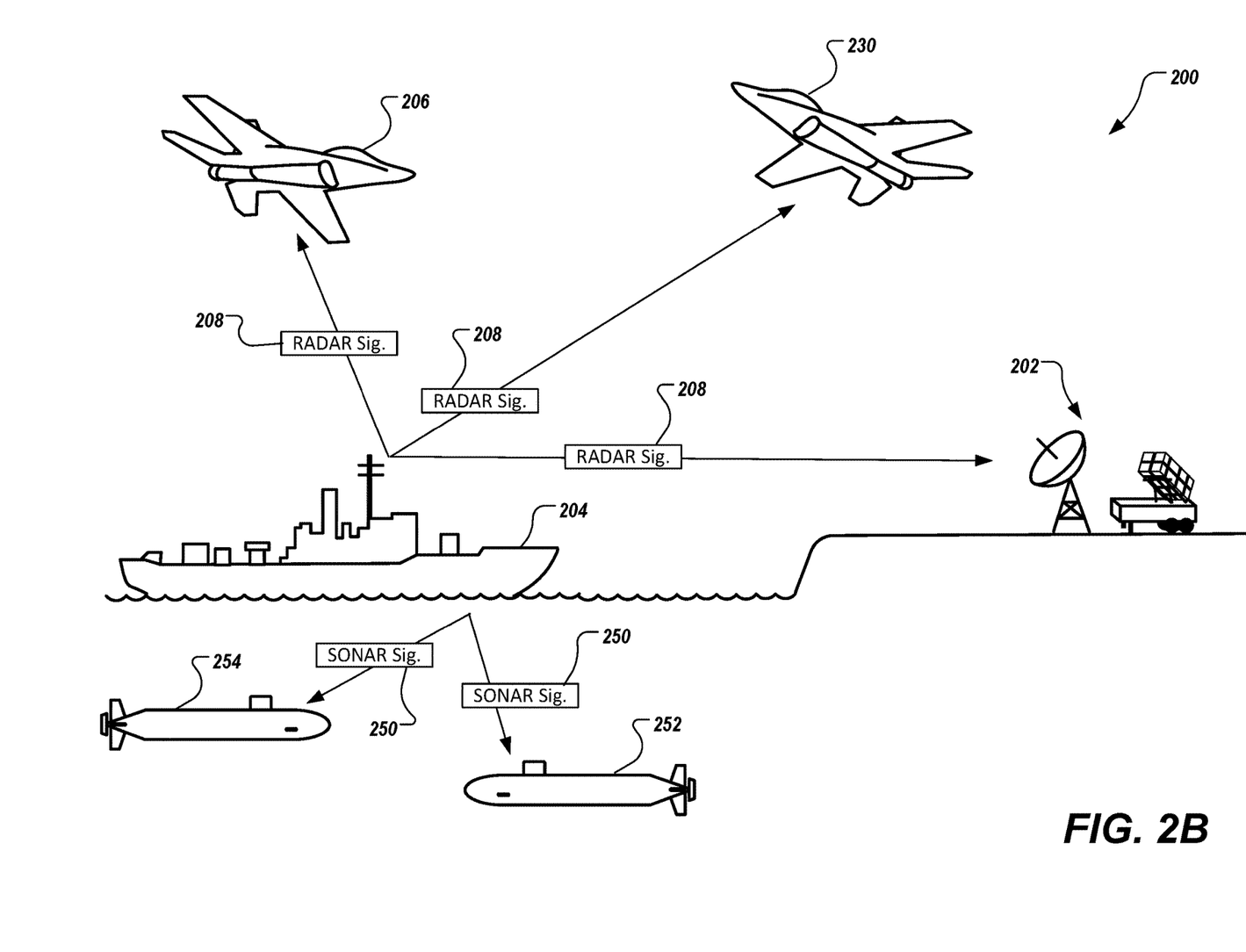

For example, referring to FIG. 2B, vessel 204 may detect enemy aircraft 206. After detecting enemy aircraft 206, the vessel's 204 radar system can add target tracking information (e.g., location, velocity, etc.) related to the enemy aircraft 206 to TM signals embedded in the radar signals 208. Friendly units, such as air defenses system 202 and friendly aircraft 230, that are in range of the radar signals 208 can detect and demodulate the TM signals to recover the target tracking information. The friendly units can begin tracking the enemy aircraft 206 before detecting it on their own radar systems.

In some implementations, TM modulated radar signals can serve as a covert friend/foe identification mechanism. For example, vessel 204 may transmit its own identity within a TM signal embedded in radar signals 208. Only the friendly units with TM capable radar receivers (e.g., air defense system 202 and aircraft 230) will be able to detect and demodulate the TM signals. In some implementations, the mere detection of a radar signal 208 that includes TM can be used to recognize nearby friendly unit.

In some implementations, TM modulated sonar signals can be used to covertly transmit information to friendly forces in a similar way as radar signals. For example, vessel 204 can include a TM capable sonar system that can add TM modulation to active sonar signals 250. In such implementations, vessel 204 can transmit a covert message to a friendly submarine 252 in a TM signal embedded in the active sonar signal 250 if the friendly submarine 252 has a TM capable sonar receiver. However, an enemy submarine 254 that does not have a TM capable sonar receiver will not be able to detect or demodulate the TM signal. For example, while tracking enemy submarine 254, vessel 204 may add TM warning signal to its active sonar signals 250 to warn friendly submarines 252 that enemy submarine 254 is in the area without alerting the enemy submarine 254 that it has been detected by vessel 204 and without alerting the enemy submarine to the presence of friendly submarine 252. The TM warning signal can also inform friendly submarine 252 that it should clear the area because vessel 204 is about to engage enemy submarine 254.

Figure 3:
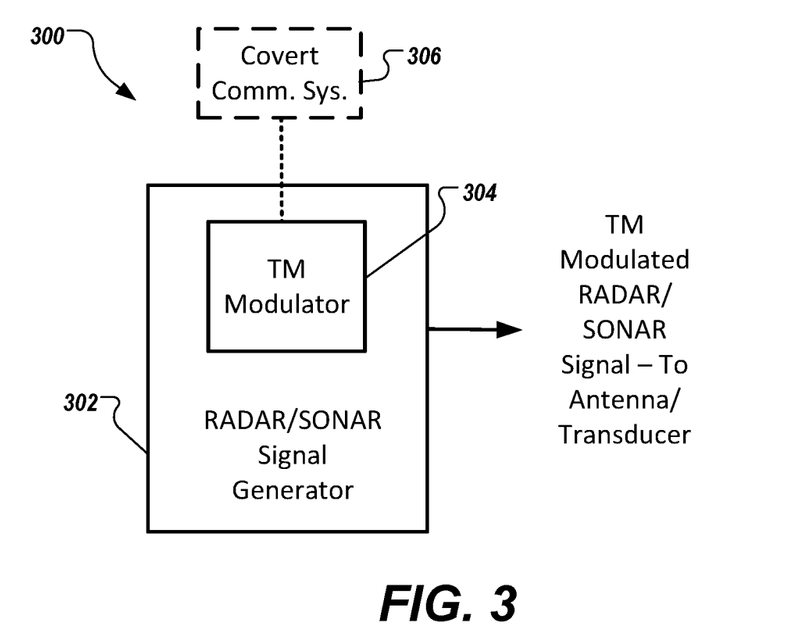
FIG. 3 depicts a block diagram of an example radar transmitter in accordance with implementations of the present disclosure.

FIG. 3 depicts a block diagram of an example signal transmitter 300 in accordance with implementations of the present disclosure. Transmitter 300 is a TM capable transmitter. Transmitter 300 can be a TM capable radar or sonar transmitter. Transmitter 300 can be implemented in hardware (e.g., as integrated circuits, chip-sets, application specific integrated circuits (ASIC) or field programmable logic arrays (FPGA)) or in software (e.g., as a software defined radio (SDR)). Transmitter 300 includes radar or sonar signal generator 302 and a TM modulator 304. In addition, transmitter 300, optionally, includes a covert communication system 306. Transmitter 300 can also include various filters and amplifiers (not shown) to properly condition signals for transmission.

Signal generator 302 generates radar or sonar signal, as appropriate. For example, a radar signal generator 302 can generate a traditional radar signal including, but not limited to, a CW radar signal, a pulsed radar signal, or a modulated radar signal (e.g., a chirp signal). A sonar signal generator 302 can generate a traditional active sonar signal.

TM modulator 304 generates a TM signal and adds the TM signal to the radar or sonar signal generated by signal generator 302. If the radar or sonar signal is not a CW signal, TM modulator 304 can add the TM signal to the carrier of the radar or sonar signal. TM modulator 304 passes the radar or sonar signal embedded with the TM signal to an antenna or transducer, as appropriate, to transmit the TM embedded radar or sonar signal.

TM modulator 304 can, for example, generate the TM signal using "wide-band TM modulation" techniques, "harmonic TM modulation" techniques, or "internal TM modulation" techniques. For example, in "wide-band TM modulation" techniques data is encoded in the TM signal by variations the location of inflection points of the carrier signal, as described in U.S. Pat. No. 9,515,815 at col. 4:48-9:19, which is incorporated herein by reference. Using "wide-band TM modulation" techniques, for example, TM modulator 304 can generate TM signals which represent covert data by variations the location of inflection points of the carrier signal.

As another example, in "harmonic TM modulation" techniques data is encoded in time or phase shifts of a harmonic of the carrier signal, which is heterodyned back to the fundamental frequency of the carrier signal, as described in U.S. Pat. No. 9,515,815 at col. 10:61-13:4 and U.S. Pat. No. 9,338,042 at col. 6:30-8:4, both of which are incorporated herein by reference. Using "harmonic TM modulation" techniques, for example, TM modulator 304 can generate TM signals which represent covert data by time or phase shifts of the carrier harmonic.

As another example, in "internal TM modulation" techniques data can be encoded in time/phase shifts, amplitude shifts, or both time/phase shifts and amplitude shifts of an internal TM signal, which can be applied to the phase or the frequency of the carrier signal, In "internal TM modulation" the internal TM signal is chosen and modulated so as to be self-canceling within symbol periods of a non-TM signal with which it is combined or within a number of cycles of the carrier frequency, and thereby preserves the feature of transparency with respect to the non-TM signal or the carrier itself. The "internal TM signal" is can be applied to the carrier by adding the internal TM signal to the carrier's phase or frequency. Using "internal TM modulation" techniques, for example, TM modulator 304 can generate TM signals which represent covert data by variations the location of time/phase shifts, amplitude shifts, or both time/phase shifts and amplitude shifts of the internal TM signal.

Covert communication system 306 can serve as an interface between transmitter 300 and communication systems of a military platform. Covert communication system 306 can provides covert information signals to TM modulator 304. TM modulator 304 can then use the covert information signals as input to provide a TM signal that encodes the covert information signals in transpositional modulation. Covert information signals can include, but are not limited to, tracking information associated with detected enemy forces, self-identification messages, operational messages, and warning messages.

In some implementations, signal generator 302 generates a radar signal an intermediate frequency (IF). In such implementations, TM modulator 304 generates the TM signal based on the IF. TM modulator 304 adds the TM signal to the IF radar signal. Signal generator 302 up-shifts the IF radar signal, with the TM signal added, to a transmission frequency prior to transmitting the radar signal.

Figure 4:
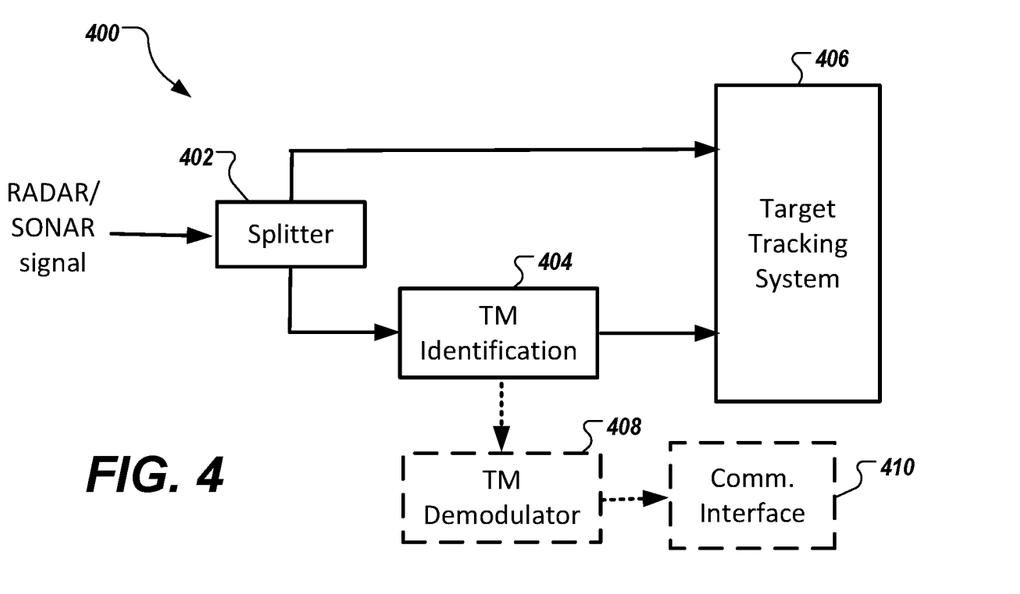
FIG. 4 depicts a block diagram of an example radar receiver in accordance with implementations of the present disclosure

FIG. 4 depicts a block diagram of an example signal receiver 400 in accordance with implementations of the present disclosure. Receiver 400 is a TM capable receiver. Receiver 400 can be a TM capable radar or sonar receiver. Receiver 400 can be implemented in hardware (e.g., as integrated circuits, chip-sets, application specific integrated circuits (ASIC) or field programmable logic arrays (FPGA)) or in software (e.g., as a software defined radio (SDR)). Receiver 400 includes a signal splitter 402, a TM identification module 404, and a target tracking system 406. In addition, receiver 400, optionally, includes a demodulator 408 and a communication interface 410. Receiver 400 can also include various filters and amplifiers (not shown) to properly process received signals.

Signal splitter 402 receives an input signal (e.g., a radar or sonar signal) and passes the signal to the target tracking system 406 and to the TM identification module 404. In some implementations, signal splitter 402 can separate the TM signal from the input signal. For example, if the original radar or sonar signal induced traditional modulation (e.g., a chirp signal) in addition to the TM signal, signal splitter 402 can separate the TM signal from the traditional modulation signal. For example, U.S. Pat. No. 9,338,042 at col. 12:18-13:38; 14:14-53, which is incorporated herein by reference, describes techniques for separating TM signals from non-TM signals. In some implementations, TM identification module 404 can separate TM signals from non-TM signals included in the input signal.

TM identification module 404 identifies whether an input signal includes transpositional modulation (e.g., a TM signal). In some implementations, the TM identification module 404 can detect TM signals without demodulating the TM signals. For example, in the case of "wide band TM" signals, TM identification module 404 can detect variations in inflection points of the input signal that indicate TM modulation. For example, in the case of "harmonic TM," after extracting the TM signal from any non-TM modulation, TM identification module 404 can mix the input signal with an appropriate harmonic of its carrier signal to shift the input signal to a TM modulation harmonic. TM identification module 404 can detect any "harmonic TM" by detecting any time or phase shifts in the TM modulation harmonic. For example, "harmonic TM" detection techniques are described in U.S. Pat. No. 9,515,815 at col. 14:1-33 which is incorporated herein by reference.

TM identification module 404 passes a TM confirmation signal to target tracking system that indicates whether or not a TM signal was detected in the input signal. Target tracking system 406 receives the input signal and the TM confirmation signal. The target tracking system 406 can identify the input signal as an ECM signal if the TM confirmation signal indicates that a TM signal was not detected. In some implementations, the target tracking system 406 can identify the input signal as a skin return if the TM confirmation signal indicates that a TM signal was detected in the input signal.

Some implementations, may not include the signal splitter. In such implementations, TM identification module 404 can identify the input signal as either an ECM signal or a skin return based on whether or not a TM signal is detected in the input signal. In some implementations, TM identification module 404 may only pass the input signal to the target tracking system 406 if a TM signal is detected in the input signal.

TM demodulator 408 can demodulate a received TM signal to obtain covert information encoded in the TM signal. TM demodulator 408 passes the demodulated information signals to communications interface 410. Communication interface 410 provides an interface with communication systems of a military platform. For example, communication interface 410 can pass the covert information to a proper system within a military platform for processing or viewing. For example, communication interface 410 may pass identification data to an IFF (identification, friend or foe) system. Communication interface 410 may pass target tracking information to target tracking system 406. Communication interface 410 may pass other covert messages to decryption systems or display devices in a communication center.

TM demodulator 408 can be configured to perform TM demodulation using "wide-band TM modulation" techniques, "harmonic TM modulation" techniques, or "internal TM modulation" techniques, as appropriate. For example, "wide-band TM" demodulation techniques are described in U.S. Pat. No. 9,515,815 at col. 9:20-10:60, which is incorporated herein by reference. "Harmonic TM" demodulation techniques are described in U.S. Pat. No. 9,515,815 at col. 13:5-15:9 and U.S. Pat. No. 9,338,042 at col. 10:66-11:44, both of which are incorporated herein by reference.

In some implementations, TM demodulator 408 is a component of TM identification module 404. For example, TM identification module 404 can be configured to identify TM signals by attempting to perform TM demodulation on the input signal. In such implementations, TM identification module 404 can identify TM signals by determining whether or not the TM demodulator outputs a signal representing TM modulated data.

Figure 5:
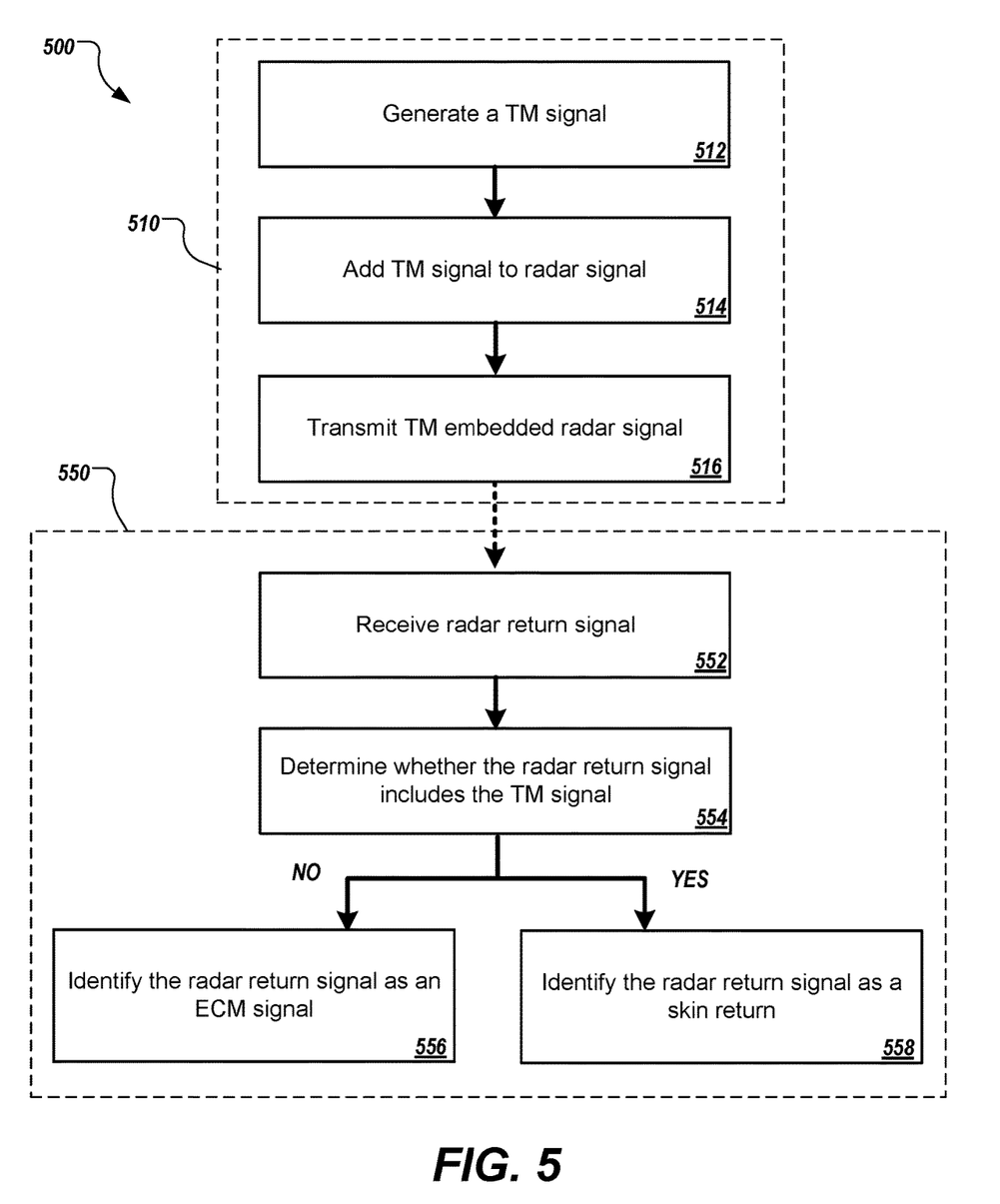
FIG. 5 depicts an example process for detecting electronic countermeasures that can be executed in accordance with implementations of the present disclosure.

FIG. 5 depicts an example process 500 that can be executed in accordance with implementations of the present disclosure. In some examples, the example process 500 can be provided as computer-executable instructions executed using one or more processing devices (e.g., a digital signal processor) or computing devices. In some examples, the process 500, or portions thereof, can be hardwired electrical circuitry, for example, as an ASIC or an FPGA device. In some examples, the process 500, or portions thereof, can be executed by a software defined radio (SDR). Process 500, or portions thereof, can be executed by a radar system or a sonar system. While process 500 can be implemented using either a radar or sonar signal, for simplicity, the following description describes process 500 being performed as applied using a radar system.

Process 500 includes two sub-processes 510, 550. Sub-process 510 is directed to embedding a TM signal in a radar. Sub-process 550 is directed to identifying a radar return signal as a skin return or an ECM signal based on whether or not the radar return includes a TM signal.

Referring first to sub-process 510, a radar system generates a TM signal (512). For example, the radar system can receive a covert information signal to be transmitted using the TM signal. The radar system can generate a TM signal using one of the above described TM modulation techniques. The radar system adds the TM signal to radar signal to produce a TM embedded radar signal (514). The radar system transmits the TM embedded radar signal (516).

Referring sub-process 550, the radar system receives a radar return signal (552). For example, the return signal may be a skin return of the TM embedded radar signal off of an object. The return signal may be an ECM signal generated by an enemy ECM device. The radar system determines whether the radar return signal includes the TM signal (554). The radar system identifies the radar return signal as a skin return signal or an electronic counter measure signal based on whether the radar return signal includes the TM signal.

If the radar system does not detect the TM signal in the radar return, the radar system can identify the return signal as an ECM signal (556). For example, in response to identifying the radar return as an ECM signal, the radar system can ignore the return signal. In some implementations, in response to identifying the radar return as an ECM signal, the radar system can shift to a different operating mode. For example, if the radar system is part of a missile guidance system, the radar system can shift from an active homing mode to a different homing mode. For example, the radar system can shift to a home-on-jam mode to guide the missile towards the source of the ECM signal.

If the radar system does detect the TM signal in the radar return, the radar system can identify the return signal as a skin return signal (558). For example, in response to identifying the radar return as a skin return, the radar system can use the radar return signal for target tracking. For example, the radar system can pass the return signal to a target tracking system. In some implementations, in response to identifying the radar return as skin return, the radar system passes the return signal to a missile guidance system. For example, the radar system can send the return signal to a missile guidance system so the guidance system can guide the missile towards a target object.

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A radar tracking system comprising:
one or more processors; and
a data store coupled to the one or more processors having instructions stored thereon which, when executed by the one or more processors, causes the one or more processors to perform operations comprising:
receiving a radar return signal from an object;
determining whether radar return signal includes a transpositional modulation (TM) signal; and
identifying the radar return signal as a skin return signal or an electronic counter measure signal based on whether the radar return signal includes the TM signal.

2. The system of claim 1, wherein identifying the radar return signal as the skin return signal or the electronic counter measure signal comprises, in response to determining that the radar return signal includes the TM signal, identifying the radar return signal as the skin return signal.

3. The system of claim 2, wherein the operations further comprise in response to identifying the radar return signal as the skin return signal, sending data to a missile guidance system to guide a missile towards the object.

4. The system of claim 2, wherein the operations further comprise in response to identifying the radar return signal as the skin return signal, sending data to a friendly unit to allow the friendly unit to track the object.

5. The system of claim 1, wherein identifying the radar return signal as the skin return signal or the electronic counter measure signal comprises, in response to determining that the radar return signal does not include the TM signal, identifying the radar return signal as the electronic counter measure signal.

6. The system of claim 5, wherein the operations further comprise in response to identifying the radar return signal as the electronic counter measure signal, shifting a target tracking system to a different operational mode.

7. The system of claim 5, wherein the operations further comprise in response to identifying the radar return signal as the electronic counter measure signal, sending data to a friendly unit informing the friendly unit of the electronic counter measure signal.

8. The system of claim 1, wherein determining whether the radar return signal includes the TM signal comprises detecting any time shifts in a harmonic of the radar return signal.

9. The system of claim 1, wherein the operations further comprise causing a transmitter to transmit a radar signal that includes the TM signal.

10. The system of claim 9, wherein the radar signal is a continuous wave signal modulated with the TM signal.

11. A method for detecting signals from electronic counter measures, the method comprising:
receiving, by one or more processors, a radar return signal from an object;
determining, by the one or more processors, whether radar return signal includes a transpositional modulation (TM) signal; and
identifying, by the one or more processors, the radar return signal as a skin return signal or an electronic counter measure signal based on whether the radar return signal includes the TM signal.

12. The method of claim 11, wherein identifying the radar return signal as the skin return signal or the electronic counter measure signal comprises, in response to determining that the radar return signal includes the TM signal, identifying the radar return signal as the skin return signal.

13. The method of claim 12, further comprising in response to identifying the radar return signal as the skin return signal, sending data to a missile guidance system to guide a missile towards the object.

14. The method of claim 12, further comprising in response to identifying the radar return signal as the skin return signal, sending data to a friendly unit to allow the friendly unit to track the object.

15. The method of claim 11, wherein identifying the radar return signal as the skin return signal or the electronic counter measure signal comprises, in response to determining that the radar return signal does not include the TM signal, identifying the radar return signal as the electronic counter measure signal.

16. The method of claim 15, further comprising in response to identifying the radar return signal as the electronic counter measure signal, shifting a target tracking system to a different operational mode.

17. The method of claim 15, further comprising in response to identifying the radar return signal as the electronic counter measure signal, sending data to a friendly unit informing the friendly unit of the electronic counter measure signal.

18. The method of claim 11, further comprising causing a transmitter to transmit a radar signal that includes the TM signal.

19. The method of claim 18, wherein the radar signal is a continuous wave signal modulated with the TM signal.

20. A radar tracking system comprising:
a receiver; a transmitter; and at least one processor coupled to the receiver and the transmitter, the at least one processor configured to perform operations comprising:

receiving a radar return signal from an object;

determining whether radar return signal includes a transpositional modulation (TM) signal; and identifying the radar return signal as a skin return signal or an electronic counter measure signal based on whether the radar return signal includes the TM signal.

21. The system of claim 20, wherein identifying the radar return signal as the skin return signal or the electronic counter measure signal comprises, in response to determining that the radar return signal does not include the TM signal, identifying the radar return signal as the electronic counter measure signal, and wherein the operations further comprise in response to identifying the radar return signal as the electronic counter measure signal, shifting a target tracking system to a different operational mode.

\* \* \* \* \*